M. O'BANNON.
TIRE.
APPLICATION FILED OCT. 20, 1919. RENEWED JAN. 11, 1922.
1,426,763.  Patented Aug. 22, 1922.
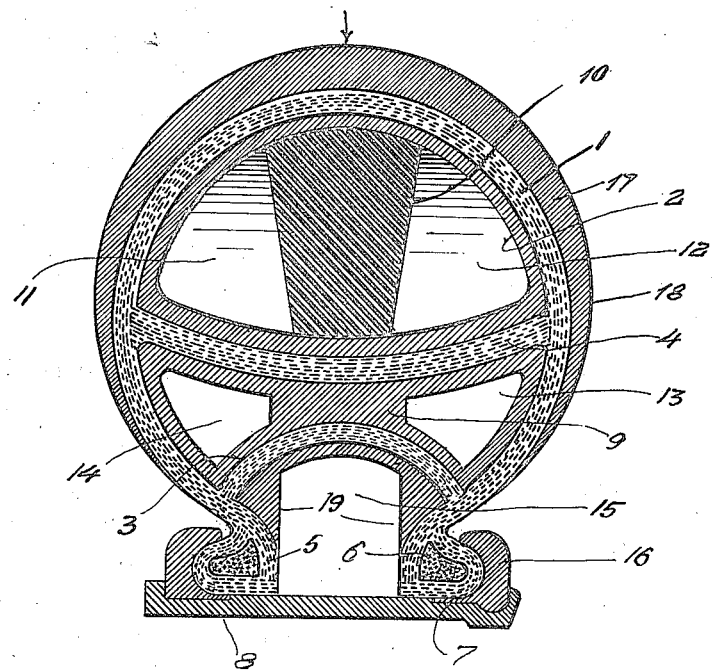
Inventor
Maurice O'Bannon
By his Attorney
Frank Ledermann

UNITED STATES PATENT OFFICE.

MAURICE O'BANNON, OF DAYTONA BEACH, FLORIDA.

TIRE.

1,426,763. Specification of Letters Patent. Patented Aug. 22, 1922.

Application filed October 20, 1919, Serial No. 331,780. Renewed January 11, 1922. Serial No. 528,560.

*To all whom it may concern:*

Be it known that I, MAURICE O'BANNON, citizen of the United States, residing at Daytona Beach, in the county of Volusia and State of Florida, have invented certain new and useful Improvements in Tires, of which the following is a specification.

This invention relates to automobile and other vehicle tires, and has for one of its objects to provide a tire of durable construction and capable of long and proficient life.

Another object is to provide a resilient tire of a novel construction receiving its resiliency from rubber members and from air under atmospheric pressure contained therein.

The above and other objects will become apparent in the description below, in which characters of reference refer to like-named parts on the accompanying drawings.

Referring briefly to the drawings, the figure represents a cross-sectional view of of my tire, showing thereby the construction of the same.

Referring now in detail to the drawings, the numeral 1 represents the main supporting member of the tire, which is of the shape shown and consists of the usual strong fabric material. As seen, said member encloses, in cross-section, nearly an entire circle, and is bridged at opposite midpoints of its horizontal diameter by a member 4 convex in the direction of the base of the tire. Likewise said member 1 is bridged near the base thereof by a member 3 convex in the direction of the tread of the tire. The ends 5 and 6 of the member 1 are turned in the direction of the base, and between said ends and the baseward side of the member 3 is a rubber filler support 19 having an air chamber 15 therein. A rubber filler 9 is fixed between the members 3 and 4, and has air chambers 13 and 14 therein. A rubber filler 2 is mounted between the member 4 and the baseward side of the treadward portion of the member 1, and a member 10 of solid rubber is mounted midway within said member 2, so that air chambers 11 and 12 are provided therein. A jacket 17 of rubber surrounds the whole in the customary way.

The ends of the member 1 are bent sharply at the base and again curved in the direction of the base, so as to make the tire suitable for attachment to a clincher rim 16. I do not, however, limit myself to this construction nor to a tire suitable only for clincher rims, as my tire may just as readily be finished for straight-side service.

That my tire is very resilient, yet also very durable, is now apparent from its construction. When the tire is in use on a vehicle, the pressure of the vehicle acts in the direction of the arrow. Thus the treadward part is depressed. This pressure is taken up by the solid member 10, and therefrom transmitted to the bridge member 4, which is thus depressed. However, the external force tends to collapse the circular member 1 into an ellipse, thus lengthening the diameter of the circle, or streching the member 4. Hence it is obvious that this latter force tends to overcome the force exerted upon the member 4 by the solid rubber member 10. Since depression of the outer surface causes a reduction of the volume of the air chambers 11, 12, these chambers therefore exert a further resilient reactive force. The force which is exerted baseward by the member 4 is taken up by the resilient rubber member 9 and its air chambers 13 and 14, and finally by the arch member 3 and its rubber support 19 and its contained air chamber 15.

It is therefore apparent that I have provided a tire which will minimize the effect of shocks caused by an irregular roadbed, and at the same time have provided a strong, durable tire.

Having thus described my invention, what I claim and desire to secure by Letters Patent, is as follows:

1. A device of the class described comprising a main member of fabric of substantially circular cross-section, said member having a bridging member between opposite ends of its horizontal diameter, said bridging member being curved convexedly baseward, a second bridging member between the ends of said first-named member and the base of the tire being curved concavedly baseward, a hollow rubber filler between said first-named bridging member and the baseward side of the top of said main member, a solid rubber member within said filler and between the treadward and baseward extremities thereof, a second filler of rubber between said first- and said second-named bridging members, air chambers within said fillers, and a rubber filler on the baseward side of said second-named bridging member.

2. A device of the class described comprising a main member of fabric of substantially circular cross-section, a central basewardly curved bridging member integral therewith, a lower treadwardly curved bridging member integral therewith, said bridging members forming compartments, rubber linings in said compartments, a solid rubber member standing wedgelike between the upper and lower walls of the upper compartment and providing air chambers on the sides of said solid member, and air chambers in said other compartment, and a rubber coat surrounding said main member.

In testimony whereof I affix my signature.

MAURICE O'BANNON.